(12) United States Patent
Lavallée et al.

(10) Patent No.: US 10,723,868 B2
(45) Date of Patent: Jul. 28, 2020

(54) FLUOROPOLYMER PROCESSING ADDITIVE, COMPOSITIONS, AND METHODS

(71) Applicant: 3M INNOVATIVE PROPERTIES COMPANY, St. Paul, MN (US)

(72) Inventors: Claude Lavallée, Maplewood, MN (US); Peter J. Scott, Woodbury, MN (US); Denis Duchesne, Woodbury, MN (US); Dale E. Hutchens, Huntsville, AL (US); Larry A. Last, Moulton, AL (US); Kirsten J. Fronek, Woodbury, MN (US); Thomas J. Blong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 15/767,893

(22) PCT Filed: Oct. 12, 2016

(86) PCT No.: PCT/US2016/056566
§ 371 (c)(1),
(2) Date: Apr. 12, 2018

(87) PCT Pub. No.: WO2017/066266
PCT Pub. Date: Apr. 20, 2017

(65) Prior Publication Data
US 2018/0312673 A1 Nov. 1, 2018

Related U.S. Application Data

(60) Provisional application No. 62/240,731, filed on Oct. 13, 2015.

(51) Int. Cl.
| | | |
|---|---|---|
| C08L 27/06 | (2006.01) |
| C08L 23/06 | (2006.01) |
| B29B 7/88 | (2006.01) |
| B29C 48/00 | (2019.01) |
| B29K 23/00 | (2006.01) |

(52) U.S. Cl.
CPC ............... *C08L 23/06* (2013.01); *B29B 7/88* (2013.01); *C08L 27/06* (2013.01); *B29C 48/022* (2019.02); *B29K 2023/0625* (2013.01); *C08L 2205/02* (2013.01); *C08L 2205/03* (2013.01); *C08L 2205/06* (2013.01); *C08L 2205/08* (2013.01); *C08L 2207/066* (2013.01)

(58) Field of Classification Search
CPC .................... C08L 27/16; C08L 27/12
See application file for complete search history.

(56) References Cited

U.S. PATENT DOCUMENTS

| | | |
|---|---|---|
| 2,968,649 A | 1/1961 | Pailthorp |
| 3,051,677 A | 8/1962 | Rexford |
| 3,318,854 A | 5/1967 | Honn |
| 4,141,874 A | 2/1979 | Oka |
| 4,535,113 A | 8/1985 | Foster |
| 4,540,538 A | 9/1985 | Corwin |
| 4,829,116 A | 5/1989 | Piesold |
| 4,840,994 A | 6/1989 | Moggi |
| 4,855,360 A | 8/1989 | Duchesne |
| 4,904,735 A | 2/1990 | Chapman, Jr. |
| 5,010,130 A | 4/1991 | Chapman, Jr. |
| 5,013,792 A | 5/1991 | Chapman, Jr. |
| 5,015,693 A | 5/1991 | Duchesne |
| 5,061,759 A | 10/1991 | Tommasi |
| 5,064,594 A | 11/1991 | Priester |
| 5,089,200 A | 2/1992 | Chapman, Jr. |
| 5,093,400 A | 3/1992 | Arcella |
| 5,106,911 A | 4/1992 | Chapman, Jr. |
| 5,132,368 A | 7/1992 | Chapman, Jr. |
| 5,266,639 A | 11/1993 | Chapman, Jr. |
| 5,284,184 A | 2/1994 | Noone |

(Continued)

FOREIGN PATENT DOCUMENTS

| | | |
|---|---|---|
| WO | WO 94/26816 | 11/1994 |
| WO | WO 2002-00783 | 1/2002 |

(Continued)

OTHER PUBLICATIONS

Ittel, "Late-Metal Catalysts for Ethylene Homo- and Copolymerization", Chemical Reviews, 2000, vol. 100, No. 04, pp. 1169-1203.
Oleg Kulikov, Klaus Hornung, Manfred Wagner; *Low Viscous Hydrophilic Processing Additives for Extrusion of Polyethylene at Reduced Temperatures*; Polymer Engineering and Science (2010); 1237-1252.
Rauwendaal, "Polymer Extrusion", Hansen Publishers, 1986, pp. 23-48.
Westover, "Melt Extrusion", Encyclopedia of Polymer Science and Technology, 1968, vol. 08, pp. 573-581.
Woods, "The Influence of Polymer Process Aid and Hindered Amine Light Stabilizer Combinations in LLDPE Blown Film Applications—Part IIB", Polymer Processing Additives, 2000, No. 29, pp. 1-17.

(Continued)

*Primary Examiner* — Mark S Kaucher

(57) ABSTRACT

A polymer composition includes a non-fluorinated, thermoplastic polymer and a minor amount of a fluoropolymer combined with the non-fluorinated polymer. A polymer processing additive composition that includes a fluoropolymer and a polymer processing additive synergist is also disclosed. The fluoropolymer includes diads represented by formula —CF2-CF(R)—CH(R')—CF(R")— in a range from about 23 mole percent to about 50 mole percent. Each R is independently —$CF_3$, —Rf, or —ORf, each R' and R" are independently H, F, $CF_3$, or —Rf, and each Rf is independently a perfluoroalkyl group having from 1 to 12 carbon atoms and optionally interrupted by one or more —O— groups. A method of reducing melt defects during the extrusion of a polymer is also disclosed.

20 Claims, No Drawings

(56) References Cited

U.S. PATENT DOCUMENTS

| | | |
|---|---|---|
| 5,285,002 A | 2/1994 | Grootaert |
| 5,378,782 A | 1/1995 | Grootaert |
| 5,397,829 A | 3/1995 | Morgan |
| 5,442,097 A | 8/1995 | Obermeier |
| 5,464,904 A | 11/1995 | Chapman, Jr. |
| 5,550,193 A | 8/1996 | Chiu |
| 5,587,429 A | 12/1996 | Priester |
| 5,710,217 A | 1/1998 | Blong |
| 6,255,536 B1 | 7/2001 | Worm |
| 6,277,919 B1 | 8/2001 | Dillon |
| 6,294,604 B1 | 9/2001 | Focquet |
| 6,294,627 B1 | 9/2001 | Worm |
| 6,599,982 B2 | 7/2003 | Oriani |
| 6,613,941 B1 | 9/2003 | Felix |
| 6,706,193 B1 | 3/2004 | Burkard |
| 6,734,252 B1 | 5/2004 | Woods |
| 6,780,481 B1 | 8/2004 | Lavallée et al. |
| 6,794,550 B2 | 9/2004 | Hintzer |
| 6,818,695 B2 | 11/2004 | Dillon |
| 6,894,118 B2 | 5/2005 | Chapman, Jr. |
| 7,001,951 B2 | 2/2006 | Chapman, Jr. |
| 7,018,541 B2 | 3/2006 | Hintzer |
| 7,375,157 B2 | 5/2008 | Amos |
| 7,420,010 B2 | 9/2008 | Sukhadia |
| 7,488,838 B2 | 2/2009 | Daute |
| 8,501,862 B2 | 8/2013 | Bonnet |
| 2004/0192818 A1 | 9/2004 | Oriani |
| 2005/0070644 A1 | 3/2005 | Tikuisis |
| 2005/0101722 A1 | 5/2005 | Briers |
| 2005/0245687 A1 | 11/2005 | Appel |
| 2005/0281973 A1 | 12/2005 | Park |
| 2008/0246181 A1* | 10/2008 | Zhu ............... B82Y 30/00 264/239 |
| 2009/0197028 A1 | 8/2009 | Lyons |
| 2010/0311906 A1 | 8/2010 | Stevenson |
| 2011/0172338 A1 | 7/2011 | Murakami |
| 2011/0244159 A1 | 10/2011 | Papp |
| 2012/0059102 A1 | 3/2012 | Cernohous |
| 2013/0109790 A1* | 5/2013 | Fukushi ............ C09D 127/12 524/84 |
| 2015/0024216 A1* | 1/2015 | Usami ............... C08J 7/08 428/422 |
| 2017/0342245 A1 | 11/2017 | Lavallée |

FOREIGN PATENT DOCUMENTS

| | | |
|---|---|---|
| WO | WO 2014-179432 | 11/2014 |
| WO | WO 2015-042415 | 3/2015 |

OTHER PUBLICATIONS

Woods, "The Influence of Polymer Process Aid and Hindered Amine Light Stabilizer Combinations in LLDPE Blown Film Applications—Part IIA", Polymer Processing Additives, 2000, No. 28, pp. 1-9.

International Search Report for PCT International Application No. PCT/US2016/056566, dated Dec. 16, 2016, 5 pages.

* cited by examiner

FLUOROPOLYMER PROCESSING ADDITIVE, COMPOSITIONS, AND METHODS

CROSS REFERENCE TO RELATED APPLICATION

This application is a national stage filing under 35 U.S.C. 371 of PCT/US2016/056566, filed Oct. 12, 2016, which claims priority to U.S. Provisional Application No. 62/240,731, filed Oct. 13, 2015, the disclosure of which is incorporated by reference in its entirety herein.

BACKGROUND

Extrusion of polymeric materials in the formation and shaping of articles is a major segment of the plastic or polymeric articles industry. The quality of the extruded article and the overall success of the extrusion process are typically influenced by the interaction of the fluid material with the extrusion die. For any melt-processable thermoplastic polymer composition, there exists a critical shear rate above which the surface of the extrudate becomes rough or distorted and below which the extrudate will be smooth. See, for example, R. F. Westover, Melt Extrusion, Encyclopedia of Polymer Science and Technology, vol. 8, pp. 573-81 (John Wiley & Sons 1968). The desire for a smooth extrudate surface competes with, and must be optimized with respect to, the economic advantages of extruding a polymer composition at the fastest possible speed (for example at high shear rates).

At low shear rates, defects in extruded thermoplastics may take the form of "sharkskin", which is a loss of surface gloss that in more serious manifestations appears as ridges running more or less transverse to the extrusion direction. At higher rates, the extrudate can undergo "continuous melt fracture" becoming grossly distorted. At rates lower than those at which continuous melt fracture is first observed, certain thermoplastics can also suffer from "cyclic melt fracture", in which the extrudate surface varies from smooth to rough.

There are other problems often encountered during the extrusion of thermoplastic polymers. They include a build-up of the polymer at the orifice of the die (known as die build up or die drool), high back pressure during extrusion runs, and excessive degradation or low melt strength of the polymer due to high extrusion temperatures. These problems slow the extrusion process either because the process must be stopped to clean the equipment or because the process must be run at a lower speed.

The addition of fluoropolymers can at least partially alleviate melt defects in extrudable thermoplastic polymers. Fluoropolymers that can be used as polymer processing additive include those described, for example, in U.S. Pat. Nos. 5,015,693 and 4,855,013 (Duchesne et al.), U.S. Pat. No. 5,710,217 (Blong et al.), and U.S. Pat. No. 6,277,919 (Dillon et al.). Some benefits of polymer processing additives include the elimination of melt fracture and surface defects, a reduction in extrusion pressure, and the elimination of die build-up. The incorporation of acidic end groups has been proposed to be beneficial to the interaction between the polymer processing additive and the die wall. See, e.g., U.S. Pat. Pub. No. 2011/0172338 (Murakami et al.) and U.S. Pat. No. 5,132,368 (Chapman et al.). On the other hand, acidity in the backbone has been proposed to be detrimental to chemical stability. See, e.g., U.S. Pat. No. 5,710,217 (Blong).

SUMMARY

The present disclosure demonstrates that increasing the acidity in the backbone of a fluoropolymer can improve the fluoropolymer's performance as a polymer processing additive, for example, during the extrusion of a non-fluorinated, thermoplastic polymer. The acidity in the backbone can be evaluated by the mole percent of diad units —$CF_2$—$CF(R)$—$CH(R')$—$CF(R'')$— in the fluoropolymer.

Thus, in one aspect, the present disclosure provides a polymer composition that includes a non-fluorinated, thermoplastic host polymer a minor amount of a fluoropolymer that is combined with the non-fluorinated, thermoplastic host polymer. The fluoropolymer includes diads represented by formula —$CF_2$—$CF(R)$—$CH(R')$—$CF(R'')$— in a range from about 23 mole percent to about 50 mole percent, wherein R is —$CF_3$, —Rf, or —ORf, R' and R'' are independently H, F, $CF_3$, or —Rf, and wherein Rf is a perfluoroalkyl group having from 1 to 12 carbon atoms and optionally interrupted by one or more —O— groups.

In another aspect, the present disclosure provides a polymer processing additive composition that includes a fluoropolymer and a polymer processing additive synergist. The fluoropolymer includes diads represented by formula —$CF_2$—$CF(R)$—$CH(R')$—$CF(R'')$— in a range from about 23 mole percent to about 50 mole percent, wherein R is —$CF_3$, —Rf, or —ORf, R' and R'' are independently H, F, $CF_3$, or —Rf, and wherein Rf is a perfluoroalkyl group having from 1 to 12 carbon atoms and optionally interrupted by one or more —O— groups.

In another aspect, the present disclosure provides a method of reducing melt defects during the extrusion of a polymer. The method includes combining a non-fluorinated, thermoplastic host polymer and a fluoropolymer to form an extrudable composition and extruding the extrudable composition. The fluoropolymer includes diads represented by formula —$CF_2$—$CF(R)$—$CH(R')$—$CF(R'')$— in a range from about 23 mole percent to about 50 mole percent, wherein R is —$CF_3$, —Rf, or —ORf, R' and R'' are independently H, F, $CF_3$, or —Rf, and wherein Rf is a perfluoroalkyl group having from 1 to 12 carbon atoms and optionally interrupted by one or more —O— groups.

In another aspect, the present disclosure provides the use of a fluoropolymer including diads represented by formula —$CF_2$—$CF(R)$—$CH(R')$—$CF(R'')$— in a range from about 23 mole percent to about 50 mole percent as a polymer processing additive. In the dyads, R is —$CF_3$, —Rf, or —ORf, R' and R'' are independently H, F, $CF_3$, or —Rf, and Rf is a perfluoroalkyl group having from 1 to 12 carbon atoms and optionally interrupted by one or more —O— groups.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

The term "perfluoroalkyl group" includes linear, branched, and/or cyclic alkyl groups in which all C—H bonds are replaced by C—F bonds.

The phrase "interrupted by one or more —O— groups", for example, with regard to an alkyl, alkylene, or arylalkylene refers to having part of the alkyl, alkylene, or arylalkylene on both sides of the one or more —O— groups. An example of an alkylene that is interrupted with one —O— group is —$CH_2$—$CH_2$—O—$CH_2$—$CH_2$—.

The term "aryl" as used herein includes carbocyclic aromatic rings or ring systems, for example, having 1, 2, or 3 rings, optionally containing at least one heteroatom (e.g., O, S, or N) in the ring, and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, oxazolyl, and thiazolyl. "Arylalkylene" refers to an "alkylene" moiety to which an aryl group is attached. "Alkylarylene" refers to an "arylene" moiety to which an alkyl group is attached.

By 'synergist' is meant a compound that allows the use of a lower amount of the fluoropolymer including diads represented by formula —$CF_2$—CF(R)—CH(R')—CF(R")— as a polymer processing additive while achieving essentially the same improvement in extrusion and processing properties of the extrudable polymer as if a higher amount of the fluoropolymer polymer processing additive was used.

It should be understood that the term "polymer processing additive synergist" per se, as used herein, does not include a fluoropolymer including diads represented by formula —$CF_2$—CF(R)—CH(R')—CF(R")— or the non-fluorinated thermoplastic polymer. In other words, a polymer processing additive synergist per se does not include the polymer processing additive or the host polymer.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

Various aspects and advantages of embodiments of the present disclosure have been summarized. The above Summary is not intended to describe each illustrated embodiment or every implementation of the present disclosure.

DETAILED DESCRIPTION

The fluoropolymer useful for practicing the present disclosure includes diads represented by formula —$CF_2$—CF(R)—CH(R')—CF(R")—. In this formula R is —$CF_3$, —Rf, or —ORf and R' and R" are independently H, F, $CF_3$, or —Rf. In some embodiments of R, R', and R", Rf is a perfluoroalkyl group having from 1 to 12 carbon atoms and optionally interrupted by one or more —O— groups. In some embodiments, Rf is a perfluoroalkyl group having from 1 to 8, 1 to 6, 1 to 4, or 1 to 3 carbon atoms and optionally interrupted by one or more —O— groups. In some embodiments, Rf is a perfluoroalkyl group having from 1 to 4 carbon atoms and optionally interrupted by one —O— group. In some embodiments, Rf is a perfluoroalkyl group having from 1 to 4 carbon atoms. In some embodiments of —ORf, Rf is $CF_3$. In some embodiments, R is —$CF_3$ or —Rf, in any of its aforementioned embodiments. In some embodiments, R is —$CF_3$. In some embodiments, R' is H, F, or —$CF_3$. In some embodiments, R' is H. In some embodiments, R" is H, F, or —$CF_3$. In some embodiments, R" is F. In some embodiments, R' and R" may not both be Rf. More than one type of diad represented by formula —$CF_2$—CF(R)—CH(R')—CF(R")— may be present in the fluoropolymer. For fluoropolymers including more than one type of diad, each R, R', and R" present in the fluoropolymer may be independently selected.

The diads represented by formula —$CF_2$—CF(R)—CH(R')—CF(R")— are present in the composition in an amount ranging from about 23 mole percent to about 50 (in some embodiments, 49, 48, 47, 46, or 45) mole percent. In some embodiments, the diads are present in an amount ranging from 25 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent. The identification of the diads and their amounts is determined by $^1H$ and $^{19}F$ nuclear magnetic resonance (NMR) spectroscopy according to the test method described below.

In some embodiments, the fluoropolymer useful for practicing the present disclosure comprises at least first copolymerized units and second copolymerized units. The first copolymerized units can include at least one of hexafluoropropylene units, units from one or more monomers independently represented by formula $CF_2$=CFRf, wherein Rf is as described above in any of its embodiments, and units from one or more monomers independently represented by formula $CF_2$=CFORf, wherein Rf is as described above in any of its embodiments. Suitable monomers represented by formula $CF_2$=CFRf include perfluorobutene and perfluoropentene. Suitable monomers represented by formula $CF_2$=CFORf include perfluoromethyl vinyl ether, perfluoroethyl vinyl ether, perfluoropropyl vinyl ether, $CF_2$=$CFOCF_2OCF_3$, $CF_2$=$CFOCF_2OCF_2CF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2CF_2OCF_2CF_3$, $CF_2$=$CFOCF_2CF_2OCF_2OCF_3$, $CF_2$=$CFOCF_2CF_2CF_2OCF_2CF_3$, $CF_2$=$CFOCF_2CF_2CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2OCF_2CF_2CF_2CF_2CF_2OCF_3$, $CF_2$=$CFOCF_2CF_2(OCF_2)_{30}CF_3$, $CF_2$=$CFOCF_2CF_2(OCF_2)_{40}CF_3$, $CF_2$=$CFOCF_2CF_2OCF_2OCF_2OCF_3$, $CF_2$=$CFOCF_2CF_2OCF_2CF_2CF_3CF_2$=$CFOCF_2CF_2OCF_2CF_2OCF_2CF_2CF_3$, $CF_2$=$CFOCF_2CF(CF_3)$—O—$C_3F_7$ (PPVE-2), $CF_2$=$CF(OCF_2CF(CF_3))_2$—O—$C_3F_7$ (PPVE-3), and $CF_2$=$CF(OCF_2CF(CF_3))_3$—O—$C_3F_7$ (PPVE-4). Many of these perfluoroalkoxyalkyl vinyl ethers can be prepared according to the methods described in U.S. Pat. No. 6,255,536 (Worm et al.) and U.S. Pat. No. 6,294,627 (Worm et al.). In some embodiments, the first copolymerized units are hexafluoropropylene units. The second copolymerized units can include units from at least one monomer independently represented by formula CH(R')=CF(R"), wherein R' and R" are as described above in any of their embodiments. In some embodiments, the second copolymerized units comprise at least one of vinylidene fluoride, trifluoroethylene, 1-hydropentafluoropropene, and 2-hydropentafluoropropene units. In some embodiments, the second copolymerized units are vinylidene fluoride units. More than one of the monomers providing the first polymerized units and more than one of the monomers providing the second polymerized units may be useful to provide the fluoropolymer useful for practicing the present disclosure.

For a random copolymer containing only first and second copolymerized units, the theoretical amount of the diad is the mole fraction of the first copolymerized units multiplied by the mole fraction of the second copolymerized units. In the case of hexafluoropropylene, the theoretical amount of the diad is mole fraction of hexafluoropropylene units since hexafluoropropylene does not homopolymerize. We have found that the theoretical amount of diad is close to the mole percent of diad evidenced by $^1$H and $^{19}$F NMR spectroscopy as shown in the Examples, below. Thus, for copolymers of HFP and VDF, in some embodiments, the HFP units are present in an amount ranging from about 23 mole percent to about 50 (in some embodiments, 49, 48, 47, 46, or 45) mole percent, 25 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent. In these embodiments, the VDF units are present in an amount ranging from about 77 mole percent to about 50 (in some embodiments, 51, 52, 53, 54, or 55) mole percent, 75 mole percent to 50 mole percent, 75 mole percent to 51 mole percent, 70 mole percent to 50 mole percent, 70 mole percent to 51 mole percent, 65 mole percent to 50 mole percent, 65 mole percent to 51 mole percent, 62 mole percent to 50 mole percent, 62 mole percent to 51 mole percent, 60 mole percent to 50 mole percent, or 60 mole percent to 51 mole percent.

In some embodiments, the fluoropolymer useful for practicing the present disclosure includes third copolymerized units such that the fluoropolymer is a terpolymer. The third copolymerized can comprise at least one of perfluoroolefins (e.g., tetrafluoroethylene (TFE)), halogenated fluoroolefins (e.g., trifluorochloroethylene (CTFE)), and hydrogen-containing monomers such as olefins (e.g., ethylene and propylene) and vinyl ethers (ethyl vinyl ether and butyl vinyl ether). In some embodiments, the third copolymerized units are TFE units. Adding TFE to the polymer will affect the diad content and at the same time yield $CF_2COOH$ groups instead of the $CH_2OH$ obtained from the initiation at the VDF monomer. For a terpolymer of TFE, HFP, and VDF, the theoretical amount of the diad is mole fraction of HFP multiplied by the mole fraction (VDF/VDF+TFE). We have found that the theoretical amount of diad is close to the mole percent of diad evidenced by $^1$H and $^{19}$F NMR spectroscopy as shown in the Examples, below. Thus, for terpolymers of HFP, VDF, and TFE, in some embodiments, the HFP units are present in an amount ranging from 23 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent. In some embodiments, the TFE units are present in an amount of up to 27 mole percent, in some embodiments, ranging from 2 mole percent to 25 mole percent, 4 mole percent to 23 mole percent, or 5 mole percent to 20 mole percent. In some embodiments, the VDF units are present in an amount ranging from 77 mole percent to 23 mole percent, 75 mole percent to 35 mole percent, 70 mole percent to 30 mole percent, 60 mole percent to 40 mole percent, 60 mole percent to 45 mole percent, 60 mole percent to 23 mole percent, 60 mole percent to 30 mole percent, or 60 mole percent to 35 mole percent.

Fluoropolymers useful as polymer processing additives, which may be useful in the compositions and methods according to the present disclosure, can have a variety of Mooney viscosities. For example, Mooney viscosities ML 1+10 @ 121° C. of from 30 to 150, 30 to 120, 30 to 110, or 30 to 90 may be useful. In some embodiments, the Mooney viscosity ML 1+10 @ 121° C. of the fluoropolymer is in a range from about 30 to about 60. In some embodiments, the Mooney viscosity ML 1+10 @ 121° C. of the fluoropolymer is in a range from about 30 to less than 60, for example 59, 58, 55 or 50. In some embodiments, the Mooney viscosity ML 1+10 @ 121° C. of the fluoropolymer is in a range from about 40 to about 58, about 40 to about 55, or about 43 to about 53. In some embodiments, the Mooney viscosity ML 1+10 @ 121° C. of the fluoropolymer is in a range from about 60 to about 90, about 60 to about 80, or about 65 about 75. Mooney viscosities can be controlled, for example, by controlling molecular weight and branching in the fluoropolymer. Mooney viscosity is determined using ASTM D1646-06 Part A by a MV 2000 instrument (available from Alpha Technologies, Ohio, USA) using a large rotor (ML 1+10) at 121° C. Mooney viscosities specified above are in Mooney units.

In some embodiments, the fluoropolymer useful for practicing the present disclosure includes long-chain branching. Such fluoropolymers are prepared by using modifiers such as bisolefins or halogen containing monoolefins during the polymerization reaction. See, for example, U.S. Pat. Appl. Pub. No. 2010/0311906 (Lavellée et al.) and U.S. Pat. No. 7,375,157 (Amos et al.), respectively. Fluoropolymers with long-chain branching having Mooney viscosities ML 1+10 @ 121° C. in a range from about 60 to about 90 effectively reduce melt fracture during extrusion and tend to be dispersed better in extrudable polymers than fluoropolymers having similar Mooney viscosities and a linear chain topography.

Fluoropolymers useful as polymer processing additives, including those described in any of the above embodiments, are typically prepared by a sequence of steps, which can include polymerization, coagulation, washing, and drying. In some embodiments, an aqueous emulsion polymerization can be carried out continuously under steady-state conditions. For example, an aqueous emulsion of monomers (e.g., including any of those described above), water, emulsifiers, buffers and catalysts can be fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The fluoropolymer can be recovered from the latex by coagulation.

The polymerization is generally conducted in the presence of a free radical initiator system, such as ammonium persulfate, potassium permanganate, AIBN, or bis(perfluoroacyl) peroxides. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al. and U.S. Pat. No. 7,018,541 to Hintzer et al. In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 100 nm and about 400 nm, and suspension polymerization will typically produce particles sizes up to several millimeters.

In some embodiments, a water soluble initiator can be useful to start the polymerization process. Salts of peroxy sulfuric acid, such as ammonium persulfate, are typically applied either alone or sometimes in the presence of a reducing agent, such as bisulfites or sulfinates (e.g., fluorinated sulfinates disclosed in U.S. Pat. Nos. 5,285,002 and 5,378,782 both to Grootaert) or the sodium salt of hydroxy methane sulfinic acid (sold under the trade designation "RONGALIT", BASF Chemical Company, New Jersey, USA). Most of these initiators and the emulsifiers have an optimum pH-range where they show most efficiency. For this reason, buffers are sometimes useful. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium. If desired, such as for improved processing, the presence of strong polar end groups such as $SO_3^{(-)}$ and $COO^{(-)}$ can be reduced through known post treatments (e.g., decarboxylation, post-fluorination). Chain transfer agents of any kind can significantly reduce the number of ionic or polar end groups. The strong polar end groups can be reduced by these methods to any desired level. In some embodiments, the number of polar functional end groups (e.g., —COF, —$SO_2$F, —$SO_3$M, —COOalkyl, and —COOM, wherein alkyl is $C_1$-$C_3$ alkyl and M is hydrogen or a metal or ammonium cation, is reduced to less than or equal to 400, 300, 200, or 100 per $10^6$ carbon atoms.

Chain transfer agents and any long-chain branching modifiers described above can be fed into the reactor by batch charge or continuously feeding. Because feed amount of chain transfer agent and/or long-chain branching modifier is relatively small compared to the monomer feeds, continuous feeding of small amounts of chain transfer agent and/or long-chain branching modifier into the reactor can be achieved by blending the long-chain branding modifier or chain transfer agent in one or more monomers.

Adjusting, for example, the concentration and activity of the initiator, the concentration of each of the reactive monomers, the temperature, the concentration of the chain transfer agent, and the solvent using techniques known in the art can control the molecular weight of the amorphous fluoropolymer. In some embodiments, fluoropolymers useful for practicing the present disclosure have weight average molecular weights in a range from 10,000 g/mol to 200,000 g/mol. In some embodiments, the weight average molecular weight is at least 15,000, 20,000, 25,000, 30,000, 40,000, or 50,000 g/mol up to 100,000, 150,000, 160,000, 170,000, 180,000, or up to 190,000 g/mol. Fluoropolymers useful for practicing the present disclosure typically have a distribution of molecular weights and compositions. Weight average molecular weights can be measured, for example, by gel permeation chromatography (i.e., size exclusion chromatography) using techniques known to one of skill in the art.

To coagulate the obtained fluoropolymer latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the fluoropolymer latex. Alternatively or additionally, the fluoropolymer latex may be frozen for coagulation. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be sufficiently reduced by one washing.

In some embodiments of the compositions and methods according to the present disclosure, the fluoropolymer can be used in combination with a polymer processing additive synergist. In some embodiments, the polymer processing additive synergist comprises at least one of poly(oxyalkylene) polymer, a silicone-polyether copolymer; an aliphatic polyester such as poly(butylene adipate), poly (lactic acid) and polycaprolactone polyesters; a polytetrafluoroethylene (e.g., a polytetrafluoroethylene micropowder), or an aromatic polyester such as phthalic acid diisobutyl ester. In some embodiments, the polymer processing additive synergist comprises at least one of polycaprolactone or a poly (oxyalkylene).

Poly(oxyalkylene) polymers useful as polymer processing additive synergists can be represented by formula $A[(OR^1)_x OR^2]_y$, wherein A is typically alkylene interrupted by one or more ether linkages, y is 2 or 3, $(OR^1)_x$ is a poly(oxyalkylene) chain having a plurality (x) of oxyalkylene groups, $OR^1$, wherein each $R^1$ is independently $C_2$ to $C_5$ alkylene, in some embodiments, $C_2$ to $C_3$ alkylene, x is about 3 to 3000, $R^2$ is hydrogen, alkyl, aryl, arylalkenyl, alkylarylenyl, —C(O)-aryl, —C(O)-arylalkenyl, or —C(O)-alkylarylenyl, wherein —C(O)— is bonded to the O of $OR^2$. The variable "x" is selected such that molecular weight of the poly (oxyalkylene) polymer is in a range from about 200 to about 20,000 grams per mole (g/mol) or higher, in some embodiments about 400 to about 15,000 g/mol. In some embodiments, x is in a range from 5 to 1000 or 10 to 500. The poly(oxyalkylene) polymer chain can be a homopolymer chain such as poly (oxyethylene) in which each $R^1$ is —$CH_2CH_2$—, or poly(oxypropylene), in which each $R^1$ is —$C_3H_6$—. Or the poly(oxyalkylene) polymer chain can be a chain of randomly distributed oxyalkylene groups (e.g., a copolymer —$OC_2H_4$— and —$OC_3H_6$— units) or having alternating blocks of repeating oxyalkylene groups (e.g., a polymer comprising (—$OC_2H_4$—)$_a$ and (—$OC_3H_6$—)$_b$ blocks, wherein a+b is in a range from 5 to 5000 or higher, in some embodiments, 10 to 500. In some embodiments, A is ethylene, —$CH_2$—CH(-)—$CH_2$— (derived from glycerol), $CH_3CH_2C(CH_2$-$)_3$ (derived from 1,1,1-trimethylol propane), poly(oxypropylene), —$CH_2CH_2$—O—$CH_2CH_2$—, or —$CH_2CH_2$—O—$CH_2CH_2$—O—$CH_2CH_2$—. In some embodiments, $R^2$ is hydrogen, methyl, butyl, phenyl, benzyl, acetyl, benzoyl, or stearyl. Other useful poly(oxyalkylene) polymers are polyesters prepared, for example, from dicarboxylic acids and poly(oxyalkylene) polymers represented by formula $A[(OR^1)_xOR^2]_y$, wherein A, $R^1$, and x are as defined above, $R^2$ is hydrogen, and y is 2. Typically, the major proportion of the poly(oxyalkylene) polymer by weight will be the repeating oxyalkylene groups, ($OR^1$).

In some embodiments, the poly(oxyalkylene) polymers useful as polymer processing additive synergist are polyethylene glycols and their derivatives. Polyethylene glycol (PEG) can be represented by formula $H(OC_2H_4)_{x'}OH$, where x' is about 15 to 3000. Many of these polyethylene glycols, their ethers, and their esters are commercially available from a variety of sources.

Poly(oxyalkylene) polymers and other synergists may be selected for their performance as interfacial agents in polymer processing additive blends. The (oxyalkylene) polymer or other synergist may be selected such that it (1) is in the liquid state (or molten) at a desired extrusion temperature and (2) has a lower melt viscosity than both the host polymer and the polymer processing additive. In some embodiments, the (oxyalkylene) polymer or other synergist may associate with the surface of the polymer processing additive particles in extrudable compositions. For example, the (oxyalkylene) polymer or other synergist may wet the surfaces of the polymer processing additive particles in extrudable compositions.

While the fluoropolymer can be used in combination with a polymer processing additive synergist, the examples below show that the fluoropolymer is effective as a polymer processing additive in the absence of a synergist. Accordingly, the compositions according to the present disclosure can be essentially free of a polymer processing additive synergist, including any of those described above. "Essentially free of a polymer processing additive synergist" can refer to compositions including a polymer processing additive synergist but in an amount that may be ineffective for improving the melt fracture performance during an extrusion when the polymer processing additive composition is included in a host resin. In some embodiments, the polymer processing additive composition may include up to or less than 1, 0.5, 0.25, or 0.1 percent by weight of a polymer processing additive synergist. Being "essentially free of a polymer processing additive synergist" can include being free of a polymer processing additive synergist.

In embodiments in which the fluoropolymer useful for practicing the present disclosure is combined with a poly (oxyalkylene) synergist, it may be useful for the composition to include a metal salt of a carboxylic acid, sulfonic acid, or alkylsulfate is useful for thermally stabilizing a poly(oxyalkylene) polymer. In some embodiments, the metal salt is a metal salt of a carboxylic acid or a sulfonic acid. Carboxylic acids and sulfonic acids may be monofunctional or multifunctional (e.g., difunctional) and may be aliphatic or aromatic. In other words, the carbonyl carbon or sulfonyl sulfur may be attached to an aliphatic group or aromatic ring. Aliphatic carboxylic acids and sulfonic acids may be saturated or unsaturated. In addition to the one or more —C(O)O$^-$ or —S(O)$_2$O$^-$ anions (i.e., carboxylate or sulfonate groups, respectively), the aliphatic or aromatic group may also be substituted by other functional groups including halogen (i.e., fluoro, chloro, bromo, and iodo), hydroxyl, and alkoxy groups, and aromatic rings may also be substituted by alkyl groups. In some embodiments, the carboxylic acid or sulfonic acid is monofunctional or difunctional and aliphatic, without any further substituents on the aliphatic chain. In some embodiments, the carboxylic acid is a fatty acid, for example, having an alkyl or alkenyl group with about 8 to 30 (in some embodiments, 8 to 26 or 8 to 22) carbon atoms. The common names of the fatty acids having from eight to twenty six carbon atoms are caprylic acid ($C_8$), capric acid ($C_{10}$), lauric acid ($C_{12}$), myristic acid ($C_{14}$), palmitic acid ($C_{16}$), stearic acid ($C_{18}$), arachidic acid ($C_{20}$), behenic acid ($C_{22}$), lignoceric acid ($C_{24}$), and cerotic acid ($C_{26}$). Fatty acid metal salts of these acids may be caprylate, caprate, laurate, myristate, palmitate, stearate, arachidate, behenate, lignocerate, and cerotate salts, in some embodiments. In some embodiments the carboxylic acid is other than stearic acid. Examples of useful metal cations in the metal salt of a carboxylic acid, sulfonic acid, or alkylsulfate include aluminum (Al), calcium (Ca), magnesium (Mg), zinc (Zn), barium (Ba), lithium (Li), sodium (Na), and potassium (K). In some embodiments, the metal salt is a sodium or potassium salt. In some embodiments, the metal salt is a zinc or calcium salt. Examples of metal salts of a carboxylic acid, sulfonic acid, or alkylsulfate useful for thermally stabilizing a poly(oxyalkylene) polymer in compositions and methods according to the present disclosure include calcium stearate, zinc stearate, barium stearate, aluminum stearate, potassium stearate, magnesium stearate, sodium stearate, zinc acetate, sodium acetate, sodium caprylate, sodium laurate, sodium behenate, sodium 1-decane sulfonate, sodium lauryl sulfate, and zinc phthalate. In some embodiments, the metal salt is other than calcium stearate or zinc stearate. In some embodiments, the metal salt is other than calcium stearate. For more information regarding such metal salts and their ability to stabilize a poly(oxyalkylene) polymer, see Int. Pat. Appl. Publ. No. WO2015/042415 (Lavallée et al.).

In some embodiments, the fluoropolymer composition disclosed herein can be used in combination with a silicone-containing polymer or another fluoropolymer polymer processing additive. Fluoropolymers that are useful for at least partially alleviating melt defects in extrudable thermoplastic polymers and can be used in combination with the fluoropolymer composition disclosed herein include those described, for example, in U.S. Pat. Nos. 5,015,693 and 4,855,013 (Duchesne et al.), U.S. Pat. No. 5,710,217 (Blong et al.), U.S. Pat. No. 6,277,919 (Dillon et al.), U.S. Pat. No. 7,375,157 (Amos et al.), and U.S. Pat. Appl. Pub. No. 2010/0311906 (Lavallée et al.). Some fluoropolymers useful as polymer processing additives, which may be useful in combination with the stabilized poly(oxyalkylene) polymer or poly(oxyalkylene) polymer blend, are commercially available. For example, copolymers of hexafluoropropylene and vinylidene fluoride are commercially available from 3M Company, St. Paul, Minn., under the trade designations as "DYNAMAR FX 9613" and "DYNAMAR FX 9614", and copolymers of vinylidene fluoride, tetrafluoroethylene, and hexafluoropropylene are commercially available from 3M Company under the trade designations "DYNAMAR FX 5911", and "DYNAMAR FX 5912". Other useful fluoropolymers are commercially available from E.I. duPont de Nemours and Co., Wilmington, Del., under the trade designations "VITON A" and "VITON FREEFLOW" in various grades, from Daikin Industries, Ltd., Osaka, Japan, under the trade designation "DAI-EL" in various grades, and from Arkema, Colombes, France, under the trade designation "KYNAR" in various grades. Silicones that are useful for at least partially alleviating melt defects in extrudable thermoplastic polymers and can be used in combination with the fluoropolymer composition disclosed herein include those described, for example, in U.S. Pat. No. 4,535,113 (Foster et al.) and U.S. Pat. App. Pub. No. 2011-0244159 (Papp et al.). Some silicone polymer processing additives are commercially available, for example, from Dow Corning, Midland, Mich., under the trade designation "DOW CORNING MB50-002" and Wacker Chemie AG, Munich, Germany, under the trade designation "GENIOPLAST".

While the fluoropolymer disclosed herein can be used in combination with a conventional polymer processing additive, the examples below show that the fluoropolymer is effective as a polymer processing additive in the absence of any other polymer processing additive. Accordingly, the compositions according to the present disclosure can be essentially free of a second, different fluoropolymer (that is, not have the claimed amount of diads). "Essentially free of a second, different fluoropolymers" can refer to compositions including other fluoropolymers but in an amount that may be ineffective for improving the melt fracture performance during an extrusion when the polymer processing additive composition is included in a host resin. In some embodiments, the polymer processing additive composition may include up to or less than 1, 0.5, 0.25, or 0.1 percent by weight of a second, different fluoropolymer. Being "essentially free of a second, different fluoropolymer" can include being free of a second, different fluoropolymer.

Polymer processing additive compositions according to the present disclosure may be used in the form of powders, pellets, granules of the desired particulate size or size distribution, or in any other extrudable form. These polymer processing additive compositions can contain conventional adjuvants such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica).

HALS are typically compounds that can scavenge free-radicals, which can result from oxidative degradation. Some suitable HALS include a tetramethylpiperidine group, in which the nitrogen atoms on the piperidine may be unsubstituted or substituted by alkyl or acyl. Examples of suitable HALS include decanedioic acid, bis (2,2,6,6-tetramethyl-1-(octyloxy)-4-piperidinyl)ester, bis(2,2,6,6-tetramethyl-4-piperidyl)sebacate, 8-acetyl-3-dodecyl-7,7,9,9-tetramethyl-1,3,8-triazaspiro(4,5)-decane-2,5-dione, bis(2,2,6,6-tetramethyl-4-hydroxypiperidine succinate), and bis(N-methyl-2,2,6,6-tetramethyl-4-piperidyl)secacate. Suitable HALS further include those available, for example, from BASF, Florham Park, N.J., under the trade designations "CHIMASSORB". Examples of antioxidants include those obtained under the trade designations "IRGAFOS 168", "IRGANOX 1010" and "ULTRANOX 626", also available from BASF. These stabilizers, if present, can be included in the compositions according to the present disclosure in any effective amount, typically up to 5, 2, to 1 percent by weight based on the total weight of the polymer processing additive composition and typically at least 0.1, 0.2, or 0.3 percent by weight.

Polymer compositions according to the present disclosure include a non-fluorinated host polymer. Generally, the non-fluorinated polymer is a thermoplastic, melt-processable polymer. A wide variety of thermoplastic polymers are useful. Examples of useful thermoplastic polymers include non-fluorinated polymers such as hydrocarbon resins, polyamides (e.g., nylon 6, nylon 6/6, nylon 6/10, nylon 11 and nylon 12), polyester (e.g., poly (ethylene terephthalate) and poly (butylene terephthalate)), chlorinated polyethylene, polyvinyl resins (e.g., polyvinylchoride, polyacrylates and polymethylacrylates), polycarbonates, polyketones, polyureas, polyimides, polyurethanes, polyolefins and polystyrenes.

Useful melt-processable polymers have melt flow indexes (measured according to ASTM D1238 at 190° C., using a 2160-gram weight) of 5.0 grams per 10 minutes or less, or 2.0 grams per 10 minutes or less. Generally the melt flow indexes of melt-processable polymers are at least 0.1 or 0.2 grams per 10 minutes.

In some embodiments of the compositions and methods according to the present disclosure, useful thermoplastic polymers are hydrocarbon polymers, for example, polyolefins. Examples of useful polyolefins include those having the general structure $CH_2=CHR^3$, wherein $R^3$ is a hydrogen or alkyl. In some embodiments, the alkyl radical includes up to 10 carbon atoms or from one to six carbon atoms. Melt-processable polyolefins include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 g/cm$^3$), high-density polyethylenes (e.g., those having a density of e.g. from 0.94 to about 0.98 g/cm$^3$), and polyethylene and olefin copolymers containing copolymerizable monomers (e. g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers). Melt-processable polymers include the metallic salts of the olefin copolymers, or blends thereof, that contain free carboxylic acid groups (e.g., polymers that include copolymerized acrylic acid). Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

The polyolefins useful for practicing the present disclosure may be obtained by the homopolymerization or copolymerization of olefins. Useful polyolefins may be copolymers of one or more olefins and up to about 30 weight percent or more, in some embodiments, 20 weight percent or less, of one or more monomers that are copolymerizable with such olefins. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

In some embodiments, a polyolefin useful in the polymer compositions and methods disclosed herein is prepared by Ziegler-Natta catalysis. In some embodiments, a polyolefin useful in the polymer compositions and methods disclosed herein is prepared by homogeneous catalysis. In some embodiments, homogeneous catalysis refers to catalysis in which the catalyst and the substrate are in the same phase (e.g., in solution). In some embodiments, homogeneous catalysis refers to catalysis carried out by catalysts having a single active site. Single site catalysts typically contain a single metal center.

In some embodiments, the homogeneously catalyzed polyolefin is a metallocene-catalyzed polyolefin. Metallocene catalysts typically have one or two cyclopentadienyl anions complexed to a positively charged metal such as zirconium, titanium, or hafnium. It is understood that the cyclopentadienyl groups can be substituted (e.g., by an alkyl, phenyl, or silyl group) or fused to an aromatic ring such as benzene, and two cyclopentadienyl groups or one cyclopentadienyl group and another coordinating group (e.g., N-alkyl, P-alkyl, O, or S) can be connected together through a bridging group (e.g., $(CH_3)_2Si$, $(CH_3)_2C$, or $CH_2CH_2$). The metal can include other ligands such as halogen, hydrogen, alkyl, phenyl, or an additional cyclopentadienyl group. Metallocene catalysts are typically used in combination with methyl alumoxane or borates under homogeneous reaction conditions.

Commercially available metallocene-catalyzed polyolefins include those from Exxon Chemical Company, Baytown, Tex., under the trade designations "EXXPOL", "EXACT", and "VISTAMAXX", and from Dow Chemical Company, Midland, Mich., under the trade designations "AFFINITY" and "ENGAGE".

Homogeneous or single-site catalysts other than metallocene catalysts are also useful for providing homogeneously catalyzed polyolefins. Such catalysts typically include at least one first ligand strongly bonded to a metal (e.g., zirconium, titanium, hafnium, palladium, or nickel) and at least one other ligand that may be labile. The first ligands typically remain bonded to the metal after activation (e.g., by methyl alumoxane or borate), stabilize the single form of the catalyst, do not interfere with polymerization, provide shape to the active site, and electronically modify the metal. Some useful first ligands include bulky, bidentate diimine ligands, salicylamine ligands, tridentate pyridine diimine ligands, hexamethyldisilazane, bulky phenolics, and acetylacetonate. Many of these ligands are described, for example, in Ittel et al., Chem. Rev., 2000, 100, 1169-1203. Other single site catalysts such as those described by Nova Chemicals Corporation, Calgary, Canada, under the trade designation "ADVANCED SCLAIRTECH TECHNOLOGY".

Homogeneously catalyzed polyolefins may have higher molecular weights, lower polydispersity, fewer extractables, and different stereochemistry than polyolefins made by other methods such as Ziegler-Natta catalysis. Homogeneous catalysis also allows for a broader selection of polymerizable monomers than Ziegler-Natta catalysis. Ziegler-Natta catalysis, which employs halogenated transition metal complexes mixed with organometallic compounds, can leave acidic residues in the resultant polyolefin resin. Acid-neutralizing additives such as calcium stearate and zinc stearate have been added to such resins. For homogeneously catalyzed polyolefins, such acidic residues are generally not present; therefore acid-neutralizing additives may not be required.

Examples of useful homogeneously catalyzed polyolefins include those having the general structure $CH_2\!\!=\!\!CHR^{10}$, wherein $R^{10}$ is a hydrogen or alkyl. In some embodiments, alkyl includes up to 10 carbon atoms or from one to six carbon atoms. Homogeneously catalyzed polyolefins can include polyethylene, polypropylene, poly (1-butene), poly (3-methylbutene), poly (4-methylpentene), copolymers of ethylene with propylene, 1-butene, 1-hexene, 1-octene, 1-decene, 4-methyl-1-pentene, and 1-octadecene, blends of polyethylene and polypropylene, linear or branched low-density polyethylenes (e.g. those having a density of from 0.89 to 0.94 $g/cm^3$), and high-density polyethylenes (e.g., those having a density of e.g. from 0.94 to about 0.98 $g/cm^3$). In some embodiments, the homogeneously catalyzed polyolefin is linear low density polyethylene. In any of these embodiments, the homogeneously catalyzed polyolefin may be a metallocene-catalyzed polyolefin.

Polymer compositions useful for practicing any of the embodiments of the present disclosure can contain any of the conventional adjuvants described above in any of their embodiments such as antioxidants, hindered amine light stabilizers (HALS), UV stabilizers, metal oxides (e.g., magnesium oxide and zinc oxide), antiblocks (e.g., coated or uncoated), pigments, and fillers (e.g., titanium dioxide, carbon black, and silica.

The polymers (e.g., non-fluorinated polymers) may be used in the form of powders, pellets, granules, or in any other extrudable form. Compositions according to the present disclosure can be prepared by any of a variety of ways. For example, polymer processing additive compositions can be mixed with the non-fluorinated, thermoplastic polymers during the extrusion into polymer articles. They can also be provided as polymer compositions, so-called masterbatches, which may contain further components and/or one or more host thermoplastic polymers. A masterbatch can be a useful, diluted form of the polymer processing additive. Masterbatches can contain the fluoropolymer, and optionally a synergist, dispersed in or blended with a host polymer, which can be a polyolefin, homogeneously catalyzed polyolefin, metallocene-catalyzed polyolefin, or any of the non-fluorinated thermoplastics described above. Preparation of a masterbatch may allow for more accurate amounts of a polymer processing additive to be added to an extrudable composition, for example. The masterbatch may be a composition ready to be added to a thermoplastic polymer for being extruded into a polymer article. Masterbatches, which include concentrations of polymer processing additives as described below, are often prepared at relatively high temperatures under aerobic conditions. In some embodiments in which the masterbatch includes a poly(oxyalkylene) polymer synergist, a metal salt of a carboxylic acid, sulfonic acid, or alkylsulfate as described above in any of its embodiments may be useful as a stabilizer.

The non-fluorinated, thermoplastic polymer (in some embodiments, polyolefin) to be extruded and the polymer processing additive composition can be combined together by any of the blending means usually employed in the plastics industry, such as with a compounding mill, a Banbury mixer, or a mixing extruder in which the polymer processing additive composition is uniformly distributed throughout the host thermoplastic polymer. The mixing operation is most conveniently carried out at a temperature above the melting point or softening point of fluoropolymer and/or the synergist although it is also possible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion", Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.).

Such compositions may be mixed with further non-fluorinated, thermoplastic polymer and/or further components to obtain a composition ready for processing into a polymer article. The composition may also contain all required ingredients and are ready for being extruded into a polymer article. The amount of polymer processing additive in these compositions is typically relatively low. Accordingly, the fluoropolymer is present in a minor amount in the polymer composition according to the present disclosure. A minor amount would be understood to be less than 50 percent by weight of the polymer composition. In some embodiments, the minor amount is less than 40, 30, 25, 20, or 15 percent by weight of the polymer composition. The exact amount used may be varied depending upon whether the extrudable composition is to be extruded into its final form (e. g., a film) or whether it is to be used as a masterbatch or processing additive which is to be (further) diluted with additional host polymer before being extruded into its final form.

Generally, the polymer composition according to the present disclosure, which in some embodiments is a homogeneously catalyzed or metallocene-catalyzed polyolefin composition, includes the fluoropolymer disclosed herein in a combined weight in a range from about 0.002 to 10 weight percent, based on the total weight of the polymer composition. In some embodiments, the combined weight of the fluoropolymer and the polymer processing additive synergist is in a range from 0.01 percent to 10 percent, based on the total weight of the polymer composition. In a masterbatch composition, the combined weight of the fluoropolymer and the polymer processing additive synergist is in a range from 1 percent to 10 percent, in some embodiments, 1 percent to 5 percent, 2 percent to 10 percent, or 2 percent to 5 percent, based on the total weight of the composition. If the polymer composition is to be extruded into final form and is not further diluted by the addition of host polymer, it typically contains a lower concentration of polymer processing additive composition. In some of these embodiments, the combined weight of the fluoropolymer and the polymer processing additive synergist is in a range from about 0.002 to 2 weight percent, in some embodiments about 0.01 to 1 weight percent, or 0.01 to 0.2 weight percent, based on the total weight of the polymer composition. The upper concentration of polymer processing additive used is generally determined by economic limitations rather than by any adverse physical effect of the concentration of the polymer processing additive.

The polymer compositions according to the present disclosure may be extruded or processed in a variety of ways, which includes for example, extrusion of films, extrusion blow molding, injection molding, pipe, wire and cable extrusion, and fiber production.

The Examples, below, demonstrate that the time to clear melt fracture during film extrusion decreases with increasing diad content. In some cases, the time to reach 50% melt fracture during film extrusion decreases with increasing diad content. Without wishing to be bound by theory, it is believed that the acidic hydrogen or hydrogens in the diad —$CF_2$—CF(R)—CH*(R')—CF(R")—, indicated with the asterisk, can promote adhesion to the die metal. Although the interactions between these hydrogens and the die metal would be expected to be weaker than those between sulfonic, carboxylic, and hydroxyl end groups and the die metal, their large number may greatly outweigh the effect provided by the end groups, which are available in much lower numbers.

Some Embodiments of the Disclosure

In a first embodiment, the present disclosure provides a polymer composition comprising:
a non-fluorinated, thermoplastic polymer; and
a minor amount of a fluoropolymer combined with the non-fluorinated polymer, the fluoropolymer comprising diads represented by formula —$CF_2$—CF(R)—CH(R')—CF(R")— in a range from about 23 mole percent to about 50 mole percent, wherein each R is independently —$CF_3$, —Rf, or —ORf, each R' and R" are independently H, F, $CF_3$, or —Rf, and wherein each Rf independently is a perfluoroalkyl group having from 1 to 12 carbon atoms and optionally interrupted by one or more —O— groups.

In a second embodiment, the present disclosure provides a method of reducing melt defects during the extrusion of a polymer, the method comprising:
combining a non-fluorinated, thermoplastic polymer and a fluoropolymer comprising diads represented by formula —$CF_2$—CF(R)—CH(R')—CF(R")— in a range from about 23 mole percent to about 50 mole percent, wherein each R is independently —$CF_3$, —Rf, or —ORf, each R' and R" are independently H, F, $CF_3$, or —Rf, and wherein each Rf is independently a perfluoroalkyl group having from 1 to 12 carbon atoms and optionally interrupted by one or more —O— groups to provide an extrudable composition; and
extruding the extrudable composition.

In a third embodiment, the present disclosure provides the polymer composition or method of the first or second embodiment, wherein the non-fluorinated polymer comprises at least one of a polyolefin, polyamide, polyimide, polyurethane, polyester, polycarbonate, polyketone, polyurea, polystyrene, polyvinyl chloride, polyacrylate, or polymethacrylate.

In a fourth embodiment, the present disclosure provides the polymer composition or method of the third embodiment, wherein the non-fluorinated, thermoplastic polymer is a polyolefin.

In a fifth embodiment, the present disclosure provides the polymer composition or method of the fourth embodiment, wherein the polyolefin is a homogeneously catalyzed polyolefin.

In a sixth embodiment, the present disclosure provides the composition or method of the fourth or fifth embodiment, wherein the polyolefin is a metallocene-catalyzed polyolefin.

In a seventh embodiment, the present disclosure provides the polymer composition or method of any one of the fourth to sixth embodiments, wherein the extrudable polymer or homogeneously catalyzed polyolefin is a linear low density polyethylene.

In an eighth embodiment, the present disclosure provides the polymer composition or method of any one of the first to seventh embodiments, wherein the fluoropolymer is present in a range from 0.002 percent to 10 percent, based on the total weight of the polymer composition or extrudable composition.

In a ninth embodiment, the present disclosure provides the polymer composition or method of any one of the first to eighth embodiments, further comprising a polymer processing additive synergist.

In a tenth embodiment, the present disclosure provides a polymer processing additive composition comprising:

a fluoropolymer comprising diads represented by formula —$CF_2$—CF(R)—CH(R')—CF(R")— in a range from about 23 mole percent to about 50 mole percent, wherein each R is independently —$CF_3$, —Rf, or —ORf, each R' and R" are independently H, F, $CF_3$, or —Rf, and wherein each Rf is independently a perfluoroalkyl group having from 1 to 12 carbon atoms and optionally interrupted by one or more —O— groups; and a polymer processing additive synergist.

In an eleventh embodiment, the present disclosure provides the polymer processing additive composition, polymer composition, or method of the ninth or tenth embodiment, wherein the polymer processing additive synergist comprises at least one of a poly(oxyalkylene) polymer, a silicone-polyether copolymer; an aliphatic polyester, or an aromatic polyester.

In a twelfth embodiment, the present disclosure provides the polymer processing additive composition, polymer composition, or method of any one of the ninth to eleventh embodiments, wherein the polymer processing additive synergist comprises at least one of a poly(oxyalkylene) polymer or a polycaprolactone.

In a thirteenth embodiment, the present disclosure provides the use of a fluoropolymer including diads represented by formula —$CF_2$—CF(R)—CH(R')—CF(R")— in a range from about 23 mole percent to about 50 mole percent, wherein each R is independently —$CF_3$, —Rf, or —ORf, each R' and R" are independently H, F, $CF_3$, or —Rf, and wherein each Rf is independently a perfluoroalkyl group having from 1 to 12 carbon atoms and optionally interrupted by one or more —O— groups as a polymer processing additive.

In a fourteenth embodiment, the present disclosure provides the composition, method, or use of any one of the first to thirteenth embodiments, wherein R is $CF_3$.

In a fifteenth embodiment, the present disclosure provides the composition, method, or use of any one of the first to fourteenth embodiments, wherein R' is H, and wherein R" is F.

In a sixteenth embodiment, the present disclosure provides the composition, method, or use of any one of the first to fifteenth embodiments, wherein the diads represented by formula —$CF_2$—CF(R)—CH(R')—CF(R")— are present in a range from about 25 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent.

In a seventeenth embodiment, the present disclosure provides the composition, method, or use of any one of the first to sixteenth embodiments, wherein the fluoropolymer comprises copolymerized units of hexafluoropropylene units and vinylidene fluoride units.

In an eighteenth embodiment, the present disclosure provides the composition, method, or use of the seventeenth embodiment, wherein the hexafluoropropylene units are present in a range from about 23 mole percent to about 50 mole percent, and wherein the vinylidene fluoride units are present in a range from about 50 mole percent to about 77 mole percent.

In a nineteenth embodiment, the present disclosure provides the composition, method, or use of the seventeenth or eighteenth embodiment, wherein the hexafluoropropylene units are present in a range from 25 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent, and wherein the vinylidene fluoride units are present in an amount ranging from 75 mole percent to 50 mole percent, 75 mole percent to 51 mole percent, 70 mole percent to 50 mole percent, 70 mole percent to 51 mole percent, 65 mole percent to 50 mole percent, 65 mole percent to 51 mole percent, 62 mole percent to 50 mole percent, 62 mole percent to 51 mole percent, 60 mole percent to 50 mole percent, or 60 mole percent to 51 mole percent.

In a twentieth embodiment, the present disclosure provides the composition, method, or use of any one of the first to the sixteenth embodiments, wherein the fluoropolymer is a terpolymer comprising copolymerized units of hexafluoropropylene units, vinylidene fluoride units, and tetrafluoroethylene units.

In a twenty-first embodiment, the present disclosure provides the composition, method, or use of the twentieth embodiment, wherein the hexafluoropropylene units are present in a range from about 23 mole percent to about 50 mole percent, wherein the vinylidene fluoride units are present in an amount of at least about 23 mole percent.

In the next embodiment, the present disclosure provides the composition, method or use of the twenty-first embodiment, wherein the tetrafluoroethylene units are present in an amount up to about 27 mole percent.

In a twenty-second embodiment, the present disclosure provides the composition, method, or use of the twentieth or twenty-first embodiment, wherein the hexafluoropropylene units are present in an amount ranging from 25 mole percent to 50 mole percent, 25 mole percent to 49 mole percent, 30 mole percent to 50 mole percent, 30 mole percent to 49 mole percent, 35 mole percent to 50 mole percent, 35 mole percent to 49 mole percent, 38 mole percent to 50 mole percent, 38 mole percent to 49 mole percent, 40 mole percent to 50 mole percent, or 40 mole percent to 49 mole percent, wherein the tetrafluoroethylene units are present in an amount up to about 27 mole percent, from 2 mole percent to 25 mole percent, 4 mole percent to 23 mole percent, or 5 mole percent to 20 mole percent, and wherein the vinylidene fluoride units are present in an amount ranging from 77 mole percent to 23 mole percent, 75 mole percent to 35 mole percent, 70 mole percent to 30 mole percent, 60 mole percent to 40 mole percent, 55 mole percent to 45 mole percent, 60 mole percent to 23 mole percent, 60 mole percent to 30 mole percent, or 60 mole percent to 35 mole percent.

In a twenty-third embodiment, the present disclosure provides the composition, method, or use of any one of the first to twenty-second embodiments, wherein the fluoropolymer has a Mooney viscosity ML 1+10 @ 121° C. in a range from 30 to 90.

In a twenty-fourth embodiment, the present disclosure provides the composition, method, or use of any one of the first to twenty-second embodiments, wherein a number of polar functional end groups (e.g., —COF, —SO$_2$F, —SO$_3$M, —COOalkyl, and —COOM, wherein alkyl is $C_1$-$C_3$ alkyl and M is hydrogen or a metal or ammonium cation) in the fluoropolymer is less than or equal to 400, 300, 200, or 100 per $10^6$ carbon atoms.

In a twenty-fifth embodiment, the present disclosure provides the composition, method, or use of any one of the first to twenty-fourth embodiments, wherein the composition, the polymer processing additive composition, or the extrudable composition further comprises at least one of an antioxidant or a hindered amine light stabilizer.

In order that this disclosure can be more fully understood, the following examples are set forth. It should be understood that these examples are for illustrative purposes only and are not to be construed as limiting this disclosure in any manner.

EXAMPLES

Test Methods

Monomer Composition

The monomer composition was assessed using 400 MHz or 499.7 MHz $^1$H-NMR and 376.3 MHz or 470.2 MHz $^{19}$F-NMR. Small portions (~90-130 mg) of all fluoroelastomer samples except Example 1 were totally dissolved in a 0.8-0.9 mL aliquots of deuterated acetone (acetone-$d_6$) and then the solutions were spiked with small amounts of 1,4-bis(trifluoromethyl)benzene (p-HFX), deuterated acetic acid (CD$_3$CO$_2$D), and CFCl$_3$ for NMR analyses. The sample of Example 1 exhibited poor solubility in acetone. A fraction of the sample was totally soluble in acetone-$d_6$ and a fraction formed a gel in acetone-$d_6$. Only the acetone-soluble fraction from Example 1 was analyzed at this time. 400 MHz or 499.7 MHz $^1$H-NMR spectra and 376.3 MHz or 470.2 MHz $^{19}$F-NMR spectra were acquired using Agilent VNMRS 400 and Agilent VNMRS 500 FT-NMR spectrometers that were operating with 5 mm inverse-detection gradient probes at analysis temperatures of about 22-23° C. The p-HFX was added to the sample solutions for use as a $^1$H/$^{19}$F-NMR cross integration standard to permit the cross correlation of the relative $^1$H and $^{19}$F signal intensities for quantitative purposes. The deuterated acetic acid was added to the sample solutions to shift a water proton signal downfield in the $^1$H-NMR spectrum to prevent it from interfering with the fluoroelastomer and p-HFX standard $^1$H signals of interest. The CFCl$_3$ was added as the $^{19}$F-NMR chemical shift zero calibration reference standard. The microsequence for the diads were measured from the $^{19}$F-NMR spectra by relative integrations of the peaks at approximately −75 and −70 ppm upfield of internal CFCl$_3$ in acetone-$d_6$ solvent.

Film Line Testing

The PPA additives were compounded into a master batch (MB) at a level of 3%. The MB's were prepared in 2 kg batches by shaking vigorously in a bag 1940 g of granular resin LLDPE 2.0, 2.0 g of B900, 1.4 g of zinc stearate, and 60 g of polymer processing additive (PPA). The mixture was fed to a laboratory scale, intermeshing, counter rotating, unvented, air cooled, conical twin screw (HaakeBuchler Rheomix TW-100) with a front inside diameter of 20 mm. The mixture was gravity fed to the throat of the extruder, exposed to air at a rate of 50 g/min. The extruder specific temperature profile of the 3 barrel zones (feed, metering, mixing), and die zone was 170/190/200/200° C. respectively. The extruder was run at 150 RPM for the first "compounding" pass. The 2nd pass was run with the same temperature profile but at 90 RPM while flood feeding the material. A 4 minute "purge" of material was discarded at the beginning each pass.

Unless otherwise specified, the melt fracture performance was tested using a 0.9 MI ZN LLDPE (Marflex 7109 available from Chevron Philips Chemicals). Trials were conducted using a Kiefel blown film line with a 40 mm,

| Designation | Description |
|---|---|
| FX-9613 | A partially fluorinated fluoroelastomer (FKM) processing aid commercially available from 3M Company, St. Paul, MN, USA under the trade designation "3M DYNAMAR POLYMER PROCESSING ADDITIVE FX-9613" |
| FX-5911 | A partially fluorinated fluoropolymer processing aid commercially available from 3M Company, St. Paul, MN, USA under the trade designation "3M DYNAMAR POLYMER PROCESSING ADDITIVE FX-5911" |
| LLDPE 2.0 | 2.0 MI metallocene LLDPE commercially available under the trade designation "EXXONMOBIL LLDPE LL 1002.09", as a granular resin, from Exxon Mobil Chemical, Houston, TX |
| ABT 7500 | Antiblock additive commercially available under the trade designation "Ampacet MB # 101558" from Ampacet Corporation, Tarrytown, NY |
| Erucamide | Slip additive commercially available under the trade designation "Ampacet MB # 10090" from Ampacet Corporation, Tarrytown, NY |
| B900 | Blend of "IRGAFOS 168" (sterically hindered phosphate antioxidant) and "IRGANOX 1010" (sterically hindered phenolic antioxidant) available from BASF Corporation, Florham Park, NJ, under the trade designation "IRGANOX B900" |
| Zinc stearate | Available from Alfa Aesar, MA |
| Modified FLS2530 | A partially fluorinated copolymer obtained from 3M Company, St. Paul, MN, USA. Commerically available fluoroelastomer "3M DYNEON Fluoroelastomer FLS2530" was obtained in a modified form to contain no curative. |
| FC1650 | A partially fluorinated copolymer commercially available from 3M Company, St. Paul, MN, USA under the trade designation "3M DYNEON Fluoroelastomer FC 1650" |
| FC2230 | A partially fluorinated copolymer commercially available from 3M Company, St. Paul, MN, USA under the trade designation "3M DYNEON Fluoroelastomer FC 2230" |

24/1, grooved feed extruder. The die was of spiral design with a 40-mm diameter and 0.9-mm die gap (36 mil).

Testing was done by diluting the MB to a target level of (250 to 1200 ppm) in the host resin at 210° C. (410° F.), 0.9 mm (36 mil) gap, 14 L/D, 10.5 kg/h (23 lb/h), and 220/s, in combination with 6000 ppm of ABT 7500 and 1000 ppm of erucamide.

The pressure was recorded every 10 minutes and a sample of film was collected. The film was examined for the presence of melt fracture, and the time corresponding to the disappearance of the last band of melt fracture (MF) or time to clear melt fracture was recorded (TTC). In some cases, the time required to eliminate melt fracture extended beyond the timeframe of the test. In that case, the data was fitted using a cumulative Gaussian and the time to reach 50% melt fracture (half time) was reported.

Polymerization Method

Polymerization procedure is given below for the polymer used for Illustrative Example 5. The main parameters for this recipe are reported in Table 3.

To an 80-L autoclave was added 51 liters of water, 103 grams of potassium phosphate as buffer, 36.8 g of diethylmalonate (DEM) as a charge transfer agent (CTA), 112.9 g of ammonium persulphate (APS), and a further 1000 grams of water as a rinse. The reactor temperature was maintained at 165° F. (74° C.). After a series of three nitrogen purges and evacuations the final vacuum was broken with approximately 500 g of HFP. VDF and HFP were then added at a ratio of HFP/VDF=0.651 until a reaction pressure of 155 psig was reached. The total of these amounts constitutes the precharge. As monomer was converted to polymer, monomer was fed to the reactor at a ratio of HFP/VDF=0.651. In this way a constant pressure was maintained until 14872 g of VDF was added to the reactor. At the end of the polymerization the remaining monomer was vented, the reactor cooled, and the latex recovered. Latex was coagulated with an $MgCl_2$ solution, rinsed with deionized water, and then dried overnight at 260° F. (127° C.).

Other Examples and Illustrative Examples were prepared in a similar fashion, using either the same or a smaller autoclave and the parameters listed in Table 1 and Table 3.

Fluoropolymers Used for Examples 1 and 2

The polymer used for Example 1 contained 50% mol HFP, which is the maximum attainable for a copolymer. It was prepared using the "Polymerization Method" described above with the following modifications. A 40-L autoclave, 24 liters of water, and 47.5 grams of the potassium phosphate buffer, and the conditions and charges shown in Table 1, below, were used.

TABLE 1

Polymerization Parameters - for the polymer used for Example 1

| Pressure (psi) | Temperature (F.) | APS (g) | CTA (g) | VF2 Pre-Charge (g) | HFP PreCharge (g) | VF2 Feeds (g) | HFP Feeds (g) | Run Time (min) |
|---|---|---|---|---|---|---|---|---|
| 180 | 175 | 73.8 | 0 | 119.8 | 1986 | 2800 | 6560 | 412 |

Example 2 used a high fluorine copolymer, modified "FLS2530". A second sample was obtained by blending equal amounts of "FC1650" (MV 44) and "FC2230" (MV 38) on a two roll mill (average MV ~41). This "blend", shown in Table 2, was prepared to obtain a viscosity curve that matches closely modified "FLS2530".

Samples of these fluoropolymers were tested on the film line using the procedure described above and compared to FX 9613 (MV ~33) and FX 9614 (MV ~68). They were tested without PEG using levels increasing from 300 ppm by 300 ppm increments. The polymer composition and diad content was reported in Table 2, along with the time to eliminate melt fracture (TTC) and the amount of PPA (in g) required to eliminate MF. The time to eliminate melt fracture was used as a measure of the PPA efficiency. To allow for a direct comparison and minimize the effect of the increasing level, the amount of PPA used was calculated by multiplying the concentration by the throughput and the time at each concentration. The amount of diad was measured by NMR.

TABLE 2

Examples 1 and 2 and Comparisons

|  | Target HFP (wt %) | Target VDF (wt %) | Meas. HFP (mol %) | Meas. VDF (mol %) | Expected HV Diad Probability (HFP mol %) | Meas. HV Diad (mol %) | F (wt %) | Mooney Viscosity | TTC (min) | PPA (g) |
|---|---|---|---|---|---|---|---|---|---|---|
| FX 9613 | 40% | 60% | 22% | 78% | 22% | NM | 66% | ~33 | 170 | 16.5 |
| FX 9614 | 40% | 60% | 22% | 78% | 22% | 20% | 66% | ~68 | 105 | 7.5 |
| Blend | 40% | 60% | 22% | 78% | 22% | 20% | 66% | ~41 | 185 | 19 |
| Ex. 2 | 58% | 42% | 37% | 63% | 37% | 33% | 69% | ~50 | 155 | 14.2 |
| Ex. 1 | 70% | 30% | 45% | 55% | 50% | 41% | 71% | ~56 | 130 | 10.5 |

The measured Mooney viscosity for the polymer used for Example 1 was 56. However, because of the large difference in chemical composition, direct comparison to the Mooney viscosity of standard copolymers could be misleading. This high fluorine copolymer viscosity would be a close match to the blend above, but only within the process window (210° C., 220/s). For example, at lower shear rates or angular frequencies, it exhibits a significantly lower viscosity. This imperfectly matched viscosity curve may create a bias in the performance comparison. However, it should be noted that over the whole viscosity range, the two high fluorine copolymers and the milled blend fall between 29 MV and 48 MV reference curves. Therefore, a similar level of performance would be expected for Example 1, Example 2, and the "blend" if composition had no effect. For an equivalent viscosity, the high fluorine copolymer used for Examples 1 and 2 exhibited shorter coating times than the standard copolymer "blend". The data clearly show an improvement in performance with increasing dyad level.

Illustrative Examples 3 to 5

Two polymer containing TFE were prepared along with a control. The polymerization method described above was used for Illustrative Examples 3 and 4 with the details of the recipes given in Table 3 and the polymerization results given in Table 4. The sample for Illustrative Example 3 had 24% TFE in the feed stream, the sample for Illustrative Example 4 had 5% TFE, and the sample of Illustrative Example 5 was a control with no TFE. All three samples had similar Mooney viscosities as shown in Table 4.

TABLE 3

Polymerization Parameters - for the polymer of Illustrative Examples 3 to 5

| Ex. # | Pressure (psi) | Temperature (F.) | APS (g) | CTA (g) | APS/CTA | CTA Type | VF2 PreCharge (g) | HFP PreCharge (g) | TFE PreCharge (g) |
|---|---|---|---|---|---|---|---|---|---|
| Ill. Ex. 3 | 130 | 160 | 107 | 45.4 | 2.357 | DEM | 295.7 | 1,162.5 | 197.5 |
| Ill. Ex. 4 | 155 | 165 | 116 | 37.9 | 3.061 | DEM | 689.9 | 881.6 | 59.2 |
| Ill. Ex. 5 | 155 | 165 | 112.9 | 36.8 | 3.068 | DEM | 732.6 | 992.3 | 0 |

TABLE 4

Polymerization Parameters - for the polymer of Illustrative Examples 3 to 5

| Ex # | VF2 Feeds (g) | HFP Feeds (g) | TFE Feeds (g) | Feeds VDF (wt %) | Feeds HFP (wt %) | Feeds TFE (wt %) | % F | MV | pH | Total Reaction Time (min) |
|---|---|---|---|---|---|---|---|---|---|---|
| Ill. Ex. 3 | 9,826 | 6,695 | 5224 | 45 | 31 | 24 | 68.5 | 48.7 | 2.78 | 240 |
| Ill. Ex. 4 | 14,883 | 9,481 | 1,264 | 58 | 37 | 5 | 67.2 | 52.7 | 3.42 | 236 |
| Ill. Ex. 5 | 14,884 | 9,644 | 0 | 61 | 39 | 0 | 66.0 | 55.0 | 3.71 | 218 |

The polymers prepared as shown in Tables 3 and 4, above, were tested on the film line without PEG at a fixed level of 350 ppm against an FX 9614 control using the method describe above. The probability of obtaining the diad —CF$_2$—CF(R)—CH(R')—CF(R'')— is related to the monomer composition. In a random copolymer, this would be mole fraction of HFP multiplied by the mole fraction VDF. Here, the HFP monomer will not homopolymerize, and the diad probability was obtained by multiplying the mole fraction of HFP by the mole fraction [VDF/(VDF+TFE)]. This is reported in Table 5, where the monomer composition in mole was used to calculate the diad probability. For the Illustrative Examples 3 and 4, the value obtained were larger than expected and correspond to ~92% of the HFP concentration. For Illustrative Examples 5, the value was somewhat lower than the expected values due to head to head addition of the VDF monomer.

The melt fracture elimination curves were fitted with a Gaussian and the half time to eliminate MF recorded. The half time is well correlated with the measured diad concentration, as shown in Table 5.

TABLE 5

Polymer Characteristics and Results for Illustrative Examples 3 to 5

| Ex. # | Measured VF2 (mol %) | Measured HFP (mol %) | Measured TFE (mol %) | Expected HV Diad Probability [H × V/(V + T)] (mol %) | Measured HV Diad (mol %) | MV | MF half Time (min) |
|---|---|---|---|---|---|---|---|
| Ill. Ex. 3 | 62% | 20% | 18% | 13% | 18% | 48.7 | 59.3 |
| Ill. Ex. 4 | 76% | 21% | 3% | 19% | 20% | 52.7 | 40.7 |
| Ill. Ex. 5 | 78% | 22% | 0% | 22% | 21% | 55.0 | 32.9 |
| FX 9614 | 78% | 22% | 0% | 22% | 20% | 68 | 23.3 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A polymer composition comprising:
    a non-fluorinated, thermoplastic polymer; and
    a minor amount of a fluoropolymer combined with the non-fluorinated, thermoplastic polymer, the fluoropolymer comprising diads represented by formula —CF$_2$CF(R)—CH(R')—CF(R'')— in a range from about 23 mole percent to about 50 mole percent, wherein R is —CF$_3$, —Rf, or ORf, R' and R'' are independently H, F, CF$_3$, or —Rf, and wherein Rf is a perfluoroalkyl group having from 1 to 12 carbon atoms and optionally interrupted by one or more —O— groups.

2. The polymer composition of claim 1, wherein the fluoropolymer comprises copolymerized hexafluoropropylene units and vinylidene fluoride units.

3. The polymer composition of claim 2, wherein the hexafluoropropylene units are present in a range from about 23 mole percent to about 50 mole percent, and wherein the vinylidene fluoride units are present in a range from about 50 mole percent to about 77 mole percent.

4. The polymer composition of claim 1, wherein the fluoropolymer is a terpolymer comprising copolymerized hexafluoropropylene units, vinylidene fluoride units, and tetrafluoroethylene units.

5. The polymer composition of claim 4, wherein the hexafluoropropylene units are present in a range from about 23 mole percent to about 50 mole percent, and wherein the vinylidene fluoride units are present in an amount of at least about 23 mole percent.

6. The polymer composition of claim 4, wherein the tetrafluoroethylene units are present in an amount up to about 27 mole percent.

7. The polymer composition of claim 1, wherein the fluoropolymer has a Mooney viscosity ML 1+10 @ 121° C. in a range from 30 to 90.

8. The polymer composition of claim 1, further comprising at least one polymer processing additive synergist.

9. The polymer composition of claim 8, wherein the polymer processing additive synergist comprises at least one of a poly(oxyalkylene) or a polycaprolactone.

10. The polymer composition of claim 1, wherein the non-fluorinated, thermoplastic polymer comprises at least one of a polyolefin, polyamide, polyimide, polyurethane, polyester, polycarbonate, polyketone, polyurea, polystyrene, polyvinyl chloride, polyacrylate, or polymethacrylate.

11. The polymer composition of claim 10, wherein the non-fluorinated, thermoplastic polymer comprises at least one polyolefin.

12. The polymer composition of claim 11, wherein the polyolefin is a homogeneously catalyzed polyolefin.

13. A method of reducing melt defects during the extrusion of a polymer, the method comprising extruding the polymer composition of claim 1.

14. A polymer processing additive composition comprising:
a fluoropolymer comprising diads represented by formula —$CF_2$—$CF(R)$—$CH(R')$—$CF(R'')$— in a range from about 23 mole percent to about 50 mole percent, wherein R is —$CF_3$, —Rf, or —ORf, R' and R'' are independently H, F, $CF_3$, or —Rf, and wherein Rf is a perfluoroalkyl group having from 1 to 12 carbon atoms and optionally interrupted by one or more —O— groups; and
a polymer processing additive synergist.

15. The polymer processing additive composition of claim 14, wherein the polymer processing additive synergist comprises at least one of a poly(oxyalkylene) or a polycaprolactone.

16. The polymer processing additive composition of claim 14, wherein the polymer processing additive synergist comprises at least one of a poly(oxyalkylene) polymer, a silicone-polyether copolymer, an aliphatic polyester, a polytetrafluoroethylene, or an aromatic polyester.

17. The polymer processing additive composition of claim 14, wherein R is $CF_3$, wherein R' is H, and wherein R'' is F.

18. The polymer composition of claim 8, wherein the polymer processing additive synergist comprises at least one of a poly(oxyalkylene) polymer, a silicone-polyether copolymer, an aliphatic polyester, a polytetrafluoroethylene, or an aromatic polyester.

19. The polymer composition of claim 1, wherein R is $CF_3$.

20. The polymer composition of claim 1, wherein R' is H, and wherein R'' is F.

* * * * *

UNITED STATES PATENT AND TRADEMARK OFFICE
CERTIFICATE OF CORRECTION

PATENT NO. : 10,723,868 B2
APPLICATION NO. : 15/767893
DATED : July 28, 2020
INVENTOR(S) : Claude Lavallee It is certified that error appears in the above-identified patent and that said Letters Patent is hereby corrected as shown below:

In the Specification

Column 4
Line 52, delete "$(OCF_2)_{30}CF_3$," and insert -- $(OCF_2)_3OCF_3$, --, therefor.
Line 53, delete "$(OCF_2)_{40}CF_3$," and insert -- $(OCF_2)_4OCF_3$, --, therefor.

Column 8
Line 57, after "alkylarylenyl," insert -- —C(O)-alkyl, --.

In the Claims

Column 24
Line 37, in Claim 1, delete "CF(R)" and insert -- —CF(R) --, therefor.
Line 39, in Claim 1, delete "ORf," and insert -- —ORf, --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*